United States Patent
Ariyavisitakul et al.

(10) Patent No.: US 7,664,200 B2
(45) Date of Patent: Feb. 16, 2010

(54) METHOD AND SYSTEM FOR MINIMIZING EFFECTS OF TRANSMITTER IMPAIRMENTS IN MULTIPLE INPUT MULTIPLE OUTPUT (MIMO) BEAMFORMING COMMUNICATION SYSTEMS

(75) Inventors: Sirikiat Lek Ariyavisitakul, Alpharetta, GA (US); Eric Ojard, San Francisco, CA (US); Joonsuk Kim, San Jose, CA (US)

(73) Assignee: Broadcom Corporation, Irvine, CA (US)

( * ) Notice: Subject to any disclaimer, the term of this patent is extended or adjusted under 35 U.S.C. 154(b) by 548 days.

(21) Appl. No.: 11/449,413

(22) Filed: Jun. 8, 2006

(65) Prior Publication Data

US 2007/0201575 A1  Aug. 30, 2007

Related U.S. Application Data (60) Provisional application No. 60/776,523, filed on Feb. 24, 2006.

(51) Int. Cl.
*H04K 1/02*  (2006.01)
*H04L 25/03*  (2006.01)
*H04L 25/49*  (2006.01)

(52) U.S. Cl. .............. 375/296; 375/260; 375/267; 375/299; 455/101; 455/501; 455/500

(58) Field of Classification Search ........ 375/260, 375/267, 299, 346, 347, 349, 296; 455/101, 455/510, 500
See application file for complete search history.

(56) References Cited

U.S. PATENT DOCUMENTS

2008/0112504 A1*  5/2008  Jiang et al. .............. 375/296

OTHER PUBLICATIONS

Yi Jiang et al., "Uniform Channel decomposition for MIMO Communications," IEEE Transactions on Signal Porcessing, vol. 53, No. 11, Nov. 2005, pp. 4283-4294.

* cited by examiner

*Primary Examiner*—Phuong Phu
(74) *Attorney, Agent, or Firm*—McAndrews, Held & Malloy, Ltd.

(57) ABSTRACT

Aspects of a method and system for minimizing effects of transmitter impairments in multiple input multiple output (MIMO) beamforming communication systems are presented. In one aspect of a system for minimizing effects of transmitter impairments, a MIMO transmitter may enable nulling of transmitter-induced noise by adjusting at least a portion of a plurality of signals transmitted based on a transmitter error vector magnitude (EVM). The transmitter may enable transmission of the plurality of signals subsequent to the nulling. In another aspect of a system for minimizing effects of transmitter impairments a MIMO receiver may enable nulling of transmitter-induced noise contained in a plurality of received signals based on a transmitter EVM. Each of the plurality of received signals may include information contained in a plurality of spatial streams. The receiver may enable detecting estimated values for the information contained in the plurality of spatial streams based on the nulling.

6 Claims, 7 Drawing Sheets

METHOD AND SYSTEM FOR MINIMIZING EFFECTS OF TRANSMITTER IMPAIRMENTS IN MULTIPLE INPUT MULTIPLE OUTPUT (MIMO) BEAMFORMING COMMUNICATION SYSTEMS

CROSS-REFERENCE TO RELATED APPLICATIONS/INCORPORATION BY REFERENCE

This application makes reference to, claims priority to, and claims the benefit of U.S. Provisional Application Ser. No. 60/776,523 filed Feb. 24, 2006.

This application makes reference to: U.S. patent application Ser. No. 11/417,688 filed on May 4, 2006.

Each of the above stated applications is hereby incorporated herein by reference in its entirety.

FIELD OF THE INVENTION

Certain embodiments of the invention relate to wireless communication. More specifically, certain embodiments of the invention relate to a method and system for minimizing effects of transmitter impairments in multiple input multiple output (MIMO) beamforming communication systems.

BACKGROUND OF THE INVENTION

In multiple input multiple output (MIMO) wireless systems, multiple data streams may be transmitted simultaneously using a plurality of transmitting antennas. A MIMO receiver may utilize a plurality of receiving antennas to decouple, and detect individual data streams. Two predominant methods for MIMO transmission include singular value decomposition (SVD), and layers space-time (LST) processing, also known as successive interference cancellation (SIC).

SVD may use beamforming in conjunction with a transmitter antenna array and receiver antenna array to create virtual channels, or eigen-channels, through which multiple data streams may be sent without interfering with one another. LST/SIC may use receiver antennal array processing to detect the multiple data streams, one stream at a time. For each detection "layer," the interference from yet undetected streams may be nulled out, while the interference from already detected streams may be cancelled, or subtracted, out.

The eigen-channels in SVD may have highly unequal signal to noise ratios (SNR), depending on the eigen-spread of the MIMO channel matrix. SVD may also rely upon adaptive modulation, or adaptive bit loading, to achieve greater data transfer rates for eigen-channels associated with higher SNR values, while simultaneously supporting lower data transfer rates for eigen-channels associated with lower SNR values. SVD may also suffer performance loss, by not achieving the peak theoretical data transfer rate aggregated among the eigen-channels when a broad range of modulation types are not available. For example, if a maximum data transfer rate associated with an eigen-channel requires a 1024 QAM modulation type, the maximum data transfer rate may not be achievable if the required modulation type is not available to be utilized.

LST/SIC approaches may suffer performance losses as a result of error propagation. For example, if a current layer is detected in error, the error may propagate to other layers increasing the probability that subsequent layers may also be detected in error. LST/SIC may require stream re-ordering to detect data streams with higher SNR values first to minimize error propagation. Some methods, such as vertical LST (VLST) may provide error protection through coding of each data stream. Based on the coding, decisions may be made subsequent to decoding to subtract out interference.

Alternatively, precoding based on dirty paper theory, for example Tomlinson-Harashima precoding (THP), may be utilized to pre-cancel interference at the transmitter without requiring the signals to be transmitted with greater levels of transmitted radiated power. The THP approach may require channel knowledge at the transmitter.

Geometric mean decomposition (GMD) may utilize beamforming and LST/SIC at transmitter, by utilizing THP for example, or at a receiver, by utilizing VLST for example. SNRs for each of a transmitted plurality of data streams may be about equal when utilizing GMD. Consequently, adaptive bit loading may not be required as may be the case with SVD. GMD may also not require reordering of data streams as may be the case with LST/SIC. GMD may achieve data transfer rates that are approximately equal to the channel capacity.

Circuitry within a MIMO transmitter may cause noise to be incorporated in transmitted signals. The noise may be referred to as "transmitter-induced noise." A potential cause of transmitter-induced noise may include nonlinearity in the output signal gain of power amplifiers as a function of input signals. Another potential cause of transmitter-induced noise may be phase errors between corresponding in-phase (I) and quadrature phase (Q) signals generated by the MIMO transmitter. These phase errors may be referred to as "phase noise." In general, an error in a magnitude and/or phase for an I signal, and/or an error in a magnitude and/or phase for a corresponding Q signal may be referred to as an "IQ imbalance". IQ imbalance is also a potential a cause of transmitter-induced noise. A measure of transmitter-induced noise is an error vector magnitude (EVM) as defined in IEEE resolution 802.11n, for example.

Some conventional MIMO receivers may attempt to decode information contained in received signals without compensating for transmitter-induced noise. A result may be errors that occur during the decoding of the information. Measures of errors at a MIMO receiver during decoding may include bit error rate (BER) and packet error rate (PER).

Techniques utilized in some conventional MIMO receivers based on LST/SIC may require stringent limitations on transmitter EVM to allow the MIMO receiver to achieve acceptable BER and/or PER rates when receiving and/or decoding received signals. Meeting these stringent limitations may require the utilization of expensive circuitry in the MIMO transmitter.

Further limitations and disadvantages of conventional and traditional approaches will become apparent to one of skill in the art, through comparison of such systems with some aspects of the present invention as set forth in the remainder of the present application with reference to the drawings.

BRIEF SUMMARY OF THE INVENTION

A system and/or method for minimizing effects of transmitter impairments in multiple input multiple output (MIMO) beamforming communication systems, substantially as shown in and/or described in connection with at least one of the figures, as set forth more completely in the claims.

These and other advantages, aspects and novel features of the present invention, as well as details of an illustrated embodiment thereof, will be more fully understood from the following description and drawings.

DETAILED DESCRIPTION OF THE INVENTION

Certain embodiments of the invention relate to a method and system for minimizing effects of transmitter impairments in multiple input multiple output (MIMO) beamforming communication systems. In various embodiments of the invention, a MIMO receiver may utilize transmitter EVM values to compensate, or null, transmitter-induced noise while decoding information contained in a plurality of signals received from a MIMO transmitter.

In various embodiments of the invention, a MIMO transmitter may modify beamforming parameters, utilized for transmitting a plurality of signals, based on transmitter EVM values. The modified beamforming parameters may enable the MIMO transmitter to compensate for transmitter-induced noise while encoding and transmitting information. The information may be transmitted via a wireless communication medium, for example. In an exemplary embodiment of the invention, the nulling may be referred to as beamforming optimization. In such exemplary embodiments, the nulling may be performed while maintaining intended relative SNR levels for a transmitted plurality of signals. When signals generated by the MIMO transmitter are based on geometric mean decomposition (GMD), or uniform channel decomposition (UCD) methods, for example, beamforming optimization may enable relative SNR levels for each of the transmitted plurality of signals to be about equal.

Figure 1:
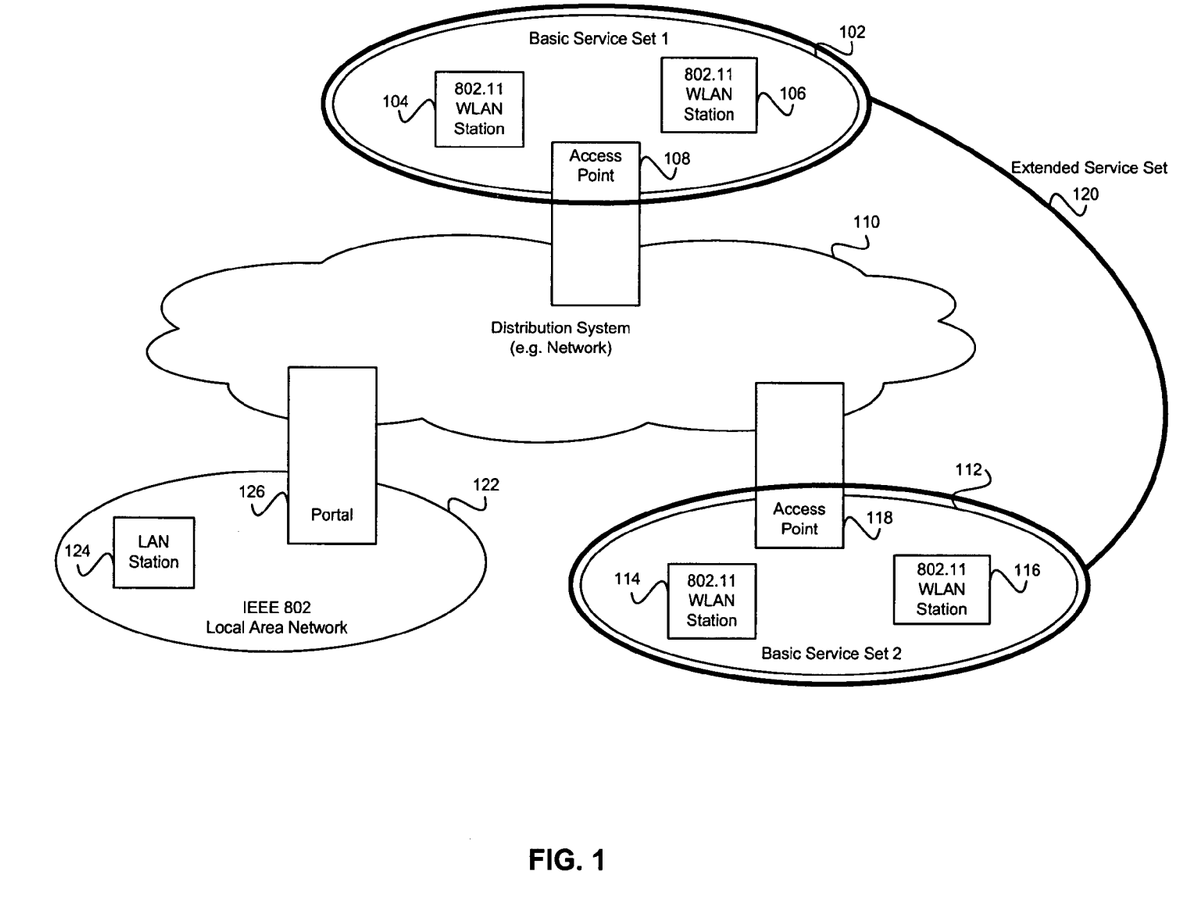
FIG. 1 is a block diagram of an exemplary system for wireless data communications, which may be utilized in connection with an embodiment of the invention.

FIG. 1 is a block diagram of an exemplary system for wireless data communications, which may be utilized in connection with an embodiment of the invention. With reference to FIG. 1, there is shown a distribution system (DS) 110, an extended service set (ESS) 120, and an IEEE 802.x LAN 122. The ESS 120 may comprise a first basic service set (BSS) 102, and a second BSS 112. The first BSS 102 may comprise a first 802.11 WLAN station 104, a second 802.11 WLAN station 106, and an access point (AP) 108. The second BSS 112 may comprise a first 802.11 WLAN station 114, a second 802.11 WLAN station 116, and an access point (AP) 118. The IEEE 802 LAN 122 may comprise a LAN station 124, and a portal 126. An IEEE 802.11 WLAN station, or IEEE 802.11 WLAN device, is a WLAN system that may be compliant with at least a portion of the IEEE 802.11 standard.

A WLAN is a communications networking environment that comprises a plurality of WLAN devices that may communicate wirelessly via one or more uplink and/or downlink RF channels. The BSS 102 or 112 may be part of an IEEE 802.11 WLAN that comprises at least 2 IEEE 802.11 WLAN stations, for example, the first 802.11 WLAN station 104, the second 802.11 WLAN station 106, and the AP 108, which may be members of the BSS 102. Non-AP stations within BSS 102, the first 802.11 WLAN station 104, and the second 802.11 WLAN station 106, may individually form an association with the AP 108. An AP, such as AP 108, may be implemented as an Ethernet switch, bridge, or other device in a WLAN, for example. Similarly, non-AP stations within BSS 112, the first 802.11 WLAN station 114, and the second 802.11 WLAN station 116, may individually form an association with the AP 118. Once an association has been formed between a first 802.11 WLAN station 104 and an AP 108, the AP 108 may communicate reachability information about the first 802.11 WLAN station 104 to other APs associated with the ESS 120, such as AP 118, and portals such as the portal 126. The WLAN station 104 may subsequently communicate information wirelessly via the BSS 102. In turn, the AP 118 may communicate reachability information about the first 802.11 WLAN station 104 to stations in BSS 112. The portal 126, which may be implemented as, for example, an Ethernet switch or other device in a LAN, may communicate reachability information about the first 802.11 WLAN station 104 to stations in LAN 122 such as the 802 LAN station 124. The communication of reachability information about the first 802.11 WLAN station 104 may enable WLAN stations that are not in BSS 102, but are associated with ESS 120, to communicate wirelessly with the first 802.11 WLAN station 104.

The DS 110 may provide an infrastructure which enables a first 802.11 WLAN station 104 in one BSS 102, to communicate wirelessly with a first 802.11 WLAN station 114 in another BSS 112. The DS 110 may also enable a first 802.11 WLAN station 104 in one BSS 102 to communicate with an 802 LAN station 124 in an IEEE 802 LAN 122, implemented as, for example a wired LAN. The AP 108, AP 118, or portal 126 may provide a means by which a station in a BSS 102, BSS 112, or LAN 122 may communicate information via the DS 110. The first 802.11 WLAN station 104 in BSS 102 may communicate information wirelessly to a first 802.11 WLAN station 114 in BSS 112 by transmitting the information wirelessly to AP 108, which may transmit the information via the DS 110 to AP 118, which in turn may transmit the information wirelessly to station 114 in BSS 112. The first 802.11 WLAN station 104 may communicate information wirelessly to the 802 LAN station 124 in LAN 122 by transmitting the information wirelessly to AP 108, which may transmit the information via the DS 110 to the portal 126, which in turn may transmit the information to the 802 LAN station 124 in LAN 122. The DS 110 may utilize wireless communications via an RF channel, wired communications, such as IEEE 802 Ethernet, or a combination thereof.

A WLAN station or AP may utilize one or more transmitting antennas, and one or more receiving antennas when communicating information. A WLAN station or AP that utilizes a plurality of transmitting antennas and/or a plurality of receiving antennas may be referred to as a multiple input multiple output (MIMO) system.

Figure 2:
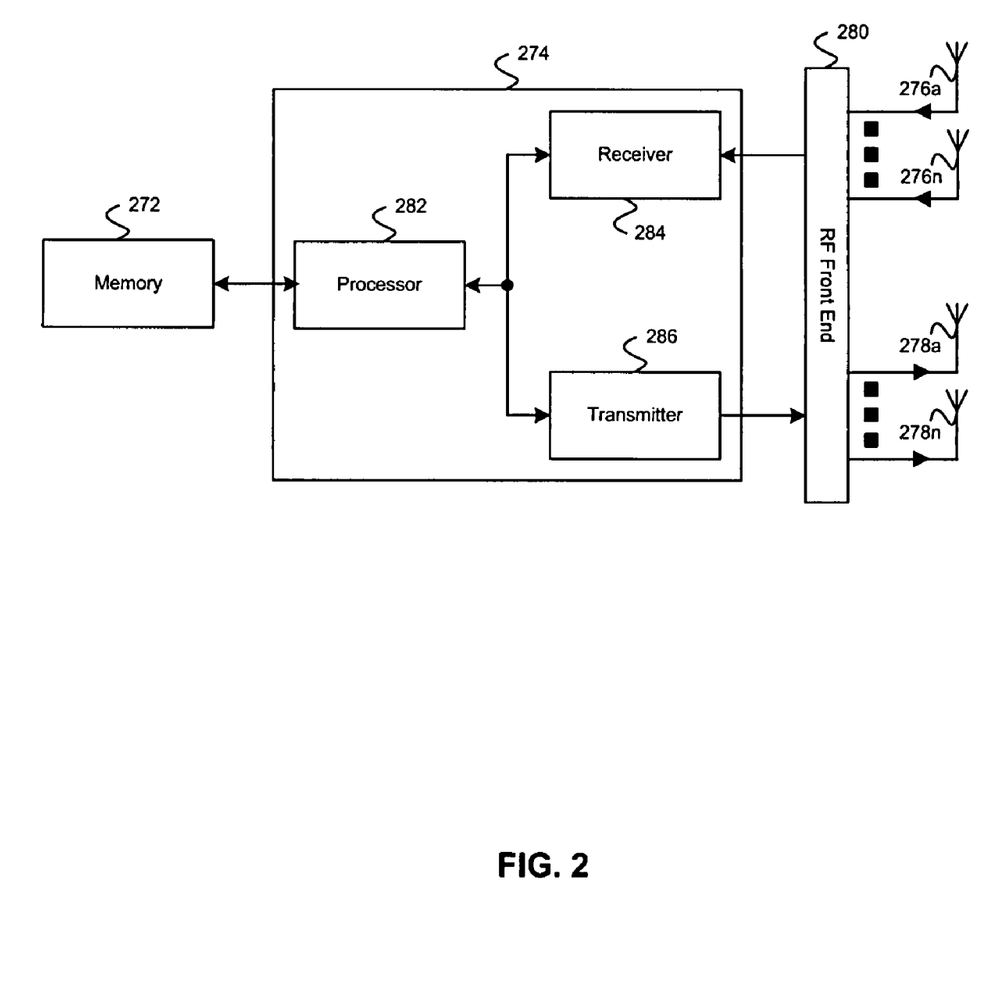
FIG. 2 is a block diagram of an exemplary MIMO system that may be utilized in connection with an embodiment of the invention.

FIG. 2 is a block diagram of an exemplary MIMO system that may be utilized in connection with an embodiment of the invention. With reference to FIG. 2 there is shown a memory 272, a transceiver 274, an RF front end 280, a plurality of receiving antennas 276a, ..., 276n, and a plurality of transmitting antennas 278a, ..., 278n. The transceiver 274 may comprise a processor 282, a receiver 284, and a transmitter 286.

The processor 282 may perform digital receiver and/or transmitter functions in accordance with applicable communications standards. These functions may comprise, but are not limited to, tasks performed at lower layers in a relevant protocol reference model. These tasks may further comprise the physical layer convergence procedure (PLCP), physical medium dependent (PMD) functions, and associated layer management functions. These functions may comprise, but are not limited to, tasks related to analysis of data received via the receiver 284, and tasks related to generating data to be transmitted via the transmitter 286. These tasks may further comprise medium access control (MAC) layer functions as specified by pertinent standards. The memory 272 may be utilized to store data and/or code, and/or utilized to retrieve data and/or code. The memory 272 may receive data and/or code via input signals along with input control signals that enable the memory 272 to store the received data and/or code. The memory 272 may receive input control signals the enable the memory 272 to output data and/or code that was previously stored. The memory 272 may receive input control signals that enable the memory 272 to delete data and/or code that was previously stored.

The receiver 284 may perform digital receiver functions that may comprise, but are not limited to, fast Fourier transform processing, beamforming processing, equalization, demapping, demodulation control, deinterleaving, depuncture, and decoding. The transmitter 286 may perform digital transmitter functions that comprise, but are not limited to, coding, puncture, interleaving, mapping, modulation control, inverse fast Fourier transform processing, beamforming processing. The RF front end 280 may receive analog RF signals via antennas 276a, ..., 276n, converting the RF signal to baseband and generating a digital equivalent of the received analog baseband signal. The digital representation may be a complex quantity comprising I and Q components. The RF front end 280 may also transmit analog RF signals via an antenna 278a, ..., 278n, converting a digital baseband signal to an analog RF signal.

In operation, the processor 282 may receive data from the receiver 284. The processor 282 may perform analysis and further processing on the received data. The processor 282 may generate a plurality of bits that are communicated to the receiver 284. The processor 282 may generate signals to control the operation of the modulation process in the transmitter 286, and of the demodulation process in the receiver 284. The processor 282 may compute weights that may be utilized for beamforming at the transmitter 286, and/or that may be utilized for detection at the receiver 284. The processor 282 may store and/or retrieve information stored in the memory 272 related to transmitter impairments, for example EVM. The processor 282 may utilize transmitter impairment information when computing weights for the transmitter 286 and/or receiver 284.

Figure 3:
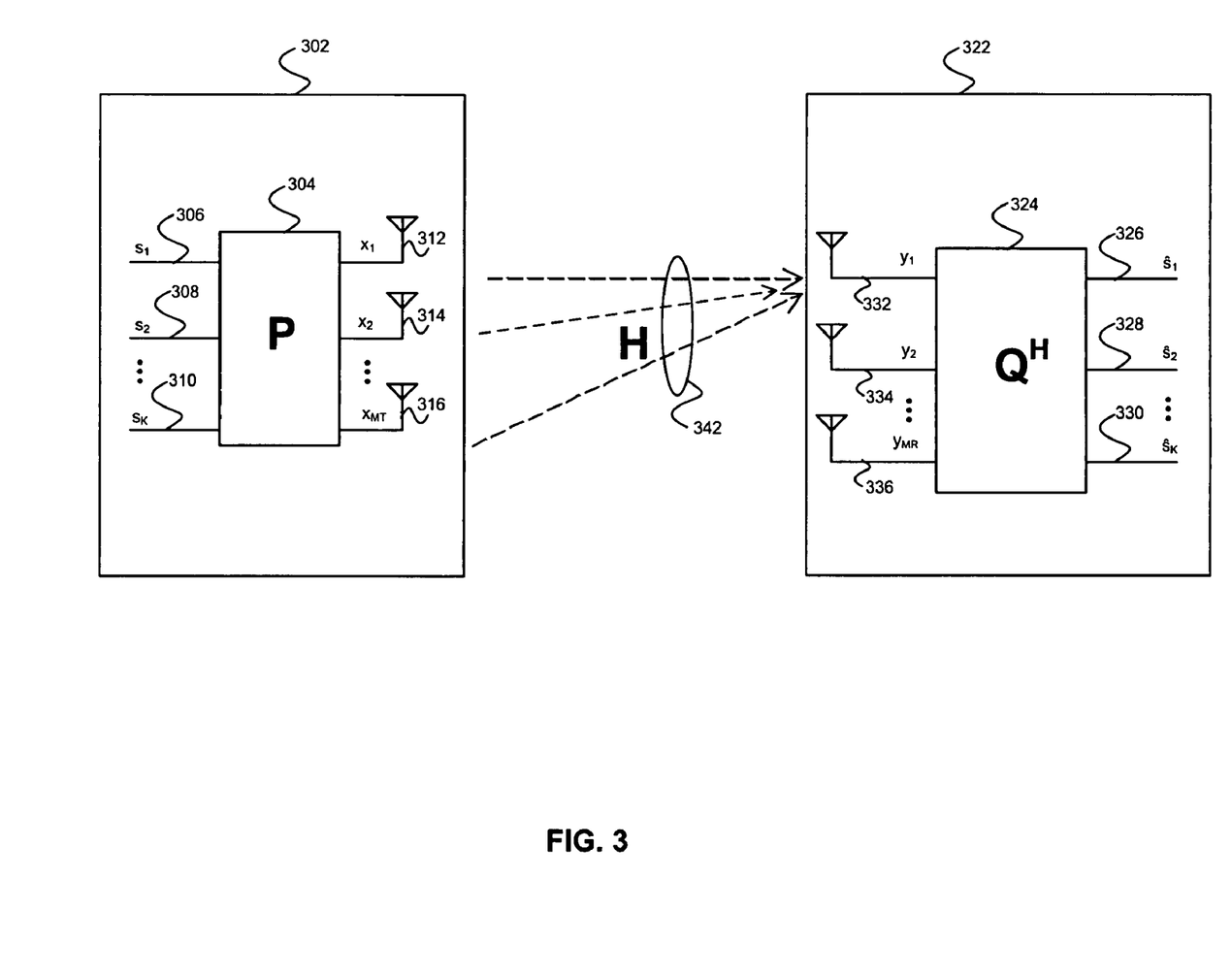
FIG. 3 is an exemplary diagram illustrating beamforming that may be utilized in connection with an embodiment of the invention.

FIG. 3 is an exemplary diagram illustrating beamforming that may be utilized in connection with an embodiment of the invention. Referring to FIG. 3 there is shown a transmitting mobile terminal 302, a receiving mobile terminal 322, and a plurality of RF channels 342. The transmitting mobile terminal 302 comprises a transmit filter coefficient block P 304, and a plurality of spatial streams $s_1$ 306, $s_2$ 308, and $s_K$ 310, where K may represent a number of spatial streams transmitted by the transmitting mobile terminal 302. The transmitting mobile terminal may further comprise a plurality of transmitting antennas 312, 314, and 316. The number of transmitting antennas may be represented by the variable N. The receiving mobile terminal 322 comprises a receive filter coefficient block $Q^H$ 324, a plurality of destination streams $\hat{s}_1$ 326, $\hat{s}_2$ 328, and $\hat{s}_K$ 330, and a plurality of receiving antennas 332, 334, and 336. The number of receiving antennas may be represented by the variable M. An exemplary mobile terminal may be a WLAN station 104, for example.

In operation, the transmitting antenna 312 may enable transmission of a signal $x_1$, the transmitting antenna 314 may enable transmission of a signal $x_2$, and the transmitting antenna 316 may enable transmission of a signal $x_N$. In a beamforming operation, each of the transmitted signals $x_1$, $x_2$, ..., $x_N$ may be a function of a weighted summation of at least one of the plurality of the spatial streams $s_1$, $s_2$, ..., $s_K$. The weights may be determined by a beamforming matrix P in connection with the transmit coefficient filter block 304.

The receiving antenna 332 may receive a signal $y_1$, the receiving antenna 334 may receive a signal $y_2$, and the receiving antenna 336 may receive a signal $y_M$. The plurality of RF channels 342 may be characterized mathematically by a transfer coefficient matrix H. The transfer coefficient matrix H may also be referred to as a channel estimate matrix.

Each of the plurality of concurrently received signals $y_1$, $y_2$, ..., $y_M$, may be computed based on the plurality of transmitted signals $x_1, x_2, \ldots, x_N$, and the transfer coefficient matrix H, and a noise vector N. The vector N may comprise a vector representation of noise that may exist in the communications medium, for example.

In a system for geometric mean decomposition (GMD) with LST detection, the matrix H may be represented by a decomposition, as in the following equation:

$$H = QRP^H \qquad \text{equation[1]}$$

where Q may represent a matrix, P may represent a beamforming matrix utilized at a MIMO transmitter 302, $P^H$ may represent an Hermitian transpose for the beamforming matrix P, and $Q^H$ may represent an Hermitian transpose for the matrix Q utilized at a MIMO receiver 322. The matrix R may represent an upper triangular matrix, or a lower triangular matrix in various embodiments of the invention. The matrix elements associated with the matrix R may each be represented by a real number.

Various embodiments of the invention may utilize GMD, which may also be referred to as uniform channel decomposition (UCD). In various embodiments of the invention that utilize GMD, the diagonal matrix elements in the matrix R may be equal such that $r_{ii} = r_{jj}$, where $r_{ii}$ may represent an $i^{th}$ diagonal matrix element and $r_{jj}$ may represent a value associated with a $j^{th}$ diagonal matrix element.

In general, an exemplary channel estimate matrix, H may comprise an M×N representation, for example $$H = \begin{bmatrix} h_{11} & \cdots & h_{1N} \\ \vdots & \ddots & \vdots \\ h_{M1} & \cdots & h_{MN} \end{bmatrix} \qquad \text{equation[2]}$$

or $$H = [h_1 \; \cdots \; h_N] \qquad \text{equation[3]}$$

where M represents the number of rows and N represents the number of columns, and where $h_i$ may represent a column vector comprising matrix elements from an $i^{th}$ column of the matrix H.

In general, an exemplary K×K upper triangular matrix R may be represented as in the following equation:

$$R = \begin{bmatrix} r_{11} & r_{12} & \cdots & & r_{1K} \\ 0 & r_{22} & r_{23} & \cdots & r_{2K} \\ \vdots & & \ddots & \ddots & \vdots \\ 0 & \cdots & & 0 & r_{KK} \end{bmatrix} \quad \text{equation[4]}$$

where each $r_{ij}$ may represent a matrix element within the matrix R as shown in equation [1].

An exemplary K×M matrix $Q^H$ may be represented as in the following equation:

$$Q^H = \begin{bmatrix} w_{11} & w_{12} & \cdots & w_{1M} \\ w_{21} & w_{22} & \cdots & w_{2M} \\ \vdots & \vdots & & \vdots \\ w_{K1} & w_{K2} & \cdots & w_{KM} \end{bmatrix} \quad \text{equation[5]}$$

$$Q^H = \begin{bmatrix} w_1^T \\ w_2^T \\ \vdots \\ w_K^T \end{bmatrix} \quad \text{equation[6]}$$

where each $W_{jk}$, in equation[5], may represent a weight utilized in connection with the receive filter coefficient block $Q^H$ 324, and each $w_i^T$, in equation[6], may represent a row vector comprising matrix elements from an $i^{th}$ row of the matrix $Q^H$. The row vector $w_i^T$ may represent a transpose for a column vector $w_i$. The column vector $w_i$ may comprise weights utilized in connection with computations for an $i^{th}$ destination stream. An exemplary column vector $w_i$ may comprise M×1 dimensions.

A minimum mean-square error (MMSE) analysis may be utilized to compute values for corresponding weights for each of the column vectors $w_i$ as in the following equation:

$$w_i = R_{I+N}^{-1}(i) h_i^* \quad \text{equation[7]}$$

where $h_i^*$ may represent a complex conjugate for the column vector $h_i$, as described in equation[3], and $R_{I+N}(i)$ may represent a correlation matrix of interference plus noise for an $i^{th}$ destination stream. In some conventional MIMO receivers the conjugate of the correlation matrix, $R^*_{I+N}(i)$, may be computed as in the following equation, for example:

$$R^*_{I+N}(i) = \sum_{k=i+1}^{N} h_k h_k^H + N_C \quad \text{equation[8]}$$

where $N_C$ may represent an M×M noise diagonal matrix, where M may represent the number of receiving antennas, and $h_k^H$ may represent an Hermitian transpose for the column vector $h_k$. The diagonal matrix $N_C$ may comprise a plurality of matrix elements $n_{ii}$ where i is an index that refers to the $i^{th}$ receiving antenna. Accordingly, the matrix element $n_{ii}$ may correspond to a measure of noise power received at the $i^{th}$ receiving antenna.

The computation from equation[8] may not enable a conventional MIMO receiver to compensate for transmitter-induced noise as measured based on an error vector magnitude (EVM). Consequently, transmitter-induced noise may be received as an uncompensated noise signal characterized by a signal power, or error vector power, represented by the variable $\sigma^2$.

In various embodiments of the invention, the MIMO receiver 322 may compensate for the error vector power when utilizing various LST/SIC and/or GMD methods, for example. In an exemplary embodiment of the invention, the MIMO receiver 322 may compute values associated with the complex conjugate of the correlation matrix of interference plus noise as in the following equation:

$$R^*_{I+N}(i) = \sum_{k=i+1}^{N} h_k h_k^H + N_C + \sigma^2 H H^H \quad \text{equation[9]}$$

where $H^H$ may represent an Hermitian transpose for the channel estimate matrix H.

In various embodiments of the invention, a MIMO receiver 322 may compensate, or null, transmitter-induced noise while decoding information contained in a plurality of signals received from the MIMO transmitter 302 based on the complex conjugate correlation matrix as computed in equation[9]. From the computation in equation[9] column vectors $w_i$ may be computed according to equation[7], for example. This method, when utilized in connection with general LST/SIC approaches without the constraints associated with GMD-based methods, may be referred to as nulling without GMD optimization.

In a conventional GMD method, a MIMO transmitter may compute values associated with the beamforming matrix P in the presence of channel noise, as represented by the diagonal matrix $N_C$, based on an augmented channel estimate matrix $H_a$, as in the following equation:

$$H_a = \begin{bmatrix} H \\ \sqrt{N_0}\, I_N \end{bmatrix} = QRP^H \quad \text{equation[10]}$$

where, H may represent the channel estimate matrix as in equation [2], $N_0$ may represent a geometric mean noise power value computed based values contained in the diagonal matrix $N_C$, and $I_N$ may represent an N×N identity matrix. The matrix R may represent a K×K upper triangular matrix, wherein the rank of the matrix H may be equal to K. The augmented channel estimate matrix $H_a$ may be represented as an (M+N)×N matrix. Based on the augmented channel estimate matrix, the beamforming matrix P may be computed.

A shortcoming in the computation of equation[10] is that computation of the beamforming matrix P may not include compensation for transmitter-induced noise. As a consequence, at the MIMO receiver 322, an SNR measurement may not be approximately equal for each of the transmitted spatial streams.

In various embodiments of the invention, the error vector power value, $\sigma^2$, may be utilized to compute a beamforming matrix P at the MIMO transmitter 302 that includes compensation for transmitter-induced noise. As a consequence, at the MIMO receiver 322, an SNR measurement may be approximately equal for each of the transmitted spatial streams. This method may be referred to as nulling with beamforming, or GMD, optimization.

In various embodiments of the invention, an augmented channel estimate matrix with GMD optimization, $\tilde{H}_a$, may be computed as in the following equation:

$$\tilde{H}_a = \begin{bmatrix} A^{-1}H \\ \sqrt{N_0}\, I_N \end{bmatrix} = QRP^H \qquad \text{equation[11]}$$

where the matrix A may represent an adjustment, which may be computed based on the following equation, for example:

$$AA^H = \frac{1}{N_0}(\sigma^2 HH^H + N_C) \qquad \text{equation[12]}$$

where the matrix $A^H$ may represent an Hermitian transpose for the matrix A.

In various embodiments of the invention, the beamforming matrix P may be computed based on the augmented channel estimate matrix with GMD optimization as in equation[11].

Figure 4:
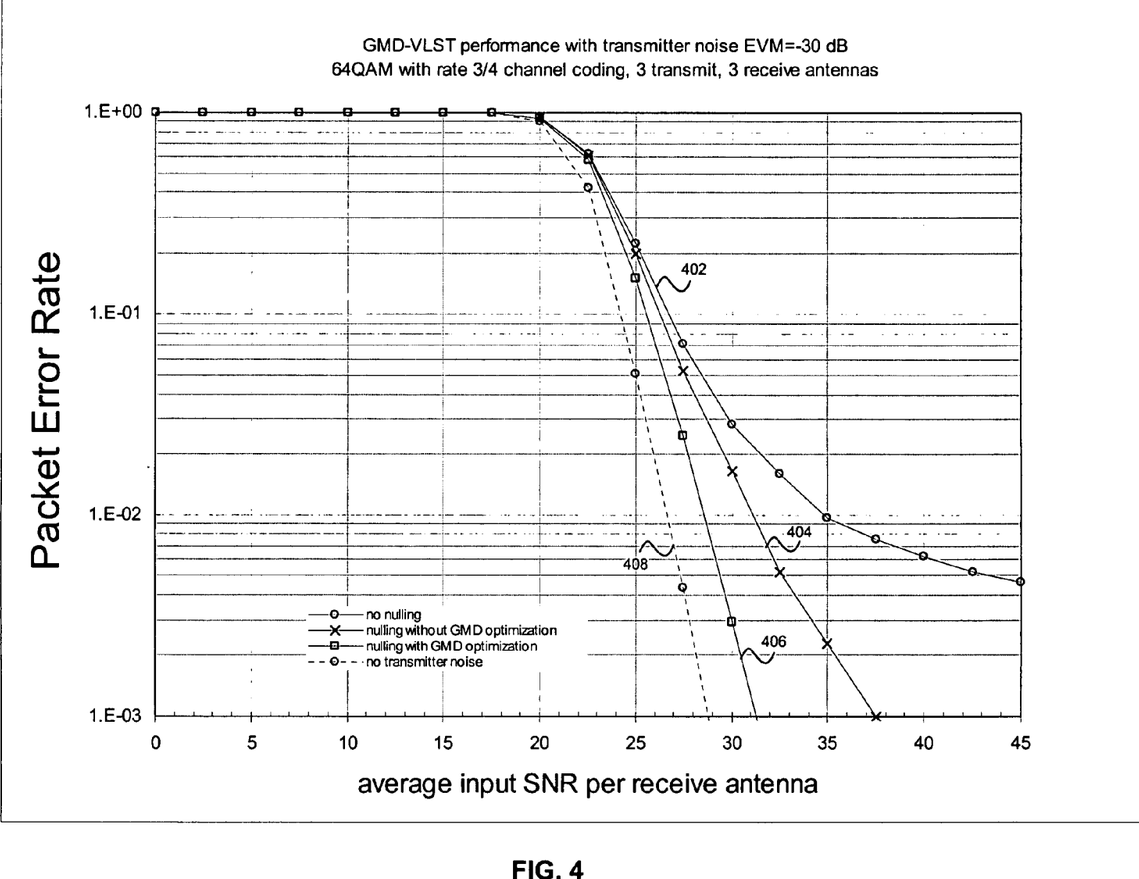
FIG. 4 is an exemplary figure illustrating packet error rate performance, in accordance with an embodiment of the invention.

FIG. 4 is an exemplary figure illustrating packet error rate performance, in accordance with an embodiment of the invention. FIG. 4 presents simulation results, which illustrates packet error rate (PER) performance as a function of SNR level for the corresponding received signal. Parameters associated with the results presented in FIG. 4 may be based on a GMD method for which EVM noise power $\sigma^2 = -30$ dB, a modulation type of 64 QAM, and a coding rate R=¾. The MIMO transmitter 302 may comprise 3 transmitting antennas, the MIMO receiver 322 may comprise 3 receiving antennas. Referring to FIG. 4, there is shown a graph representing PER performance without nulling 402, a graph representing PER performance with nulling without GMD optimization 404, a graph representing nulling with GMD optimization 406, and a graph representing no transmitter-induced noise 408.

The graph representing no transmitter-induced noise 408 may represent an ideal condition of a MIMO transmitter 302 in the absence of transmitter impairments, for which $\sigma=0$. In this ideal case, the lowest PER rates may be obtained for the lowest SNR values among the graphs 402, 404, 406, and 408 as shown in FIG. 4. The graph for nulling with GMD optimization 406 represents various embodiments of the invention in the presence of transmitter impairments. In such embodiments, SNR measurements may be approximately equal for each spatial stream at the MIMO transmitter 302, and for each destination stream at the MIMO receiver 322. In the case of nulling with GMD optimization, the second lowest PER rates may be obtained for the second lowest SNR values among the graphs 402, 404, 406, and 408 as shown in FIG. 4. For example, a PER of 0.01 may be achieved for an SNR of about 27 dB in the no transmitter-induced noise case 408, while this PER level may be achieved for an SNR of about 29 dB in the nulling with GMD optimization case 406.

The graph representing nulling with GMD optimization 404 also represents various embodiments of the invention in the presence of transmitter impairments. In such embodiments, SNR measurements may not be approximately equal for each spatial stream at the MIMO transmitter 302, and for each destination stream at the MIMO receiver 322. In the case of nulling without GMD optimization, the third lowest PER rates may be obtained for the third lowest SNR values among the graphs 402, 404, 406, and 408 as shown in FIG. 4. For example, a PER of 0.01 may be achieved for an SNR of about 27 dB in the no transmitter-induced noise case 408, while this PER level may be achieved for an SNR of about 32 dB in the nulling without GMD optimization case 404.

The graph representing the no nulling case 402 represents a MIMO system in which there may be no attempt to compensate for transmitter impairments. In the case of no nulling, the highest PER rates may be obtained based on SNR values among the graphs 402, 404, 406, and 408 as shown in FIG. 4. For example, a PER of 0.01 may be achieved for an SNR of about 27 dB in the no transmitter-induced noise case 408, while this PER level may be achieved for an SNR of about 35 dB in the no nulling case 402.

Figure 5:
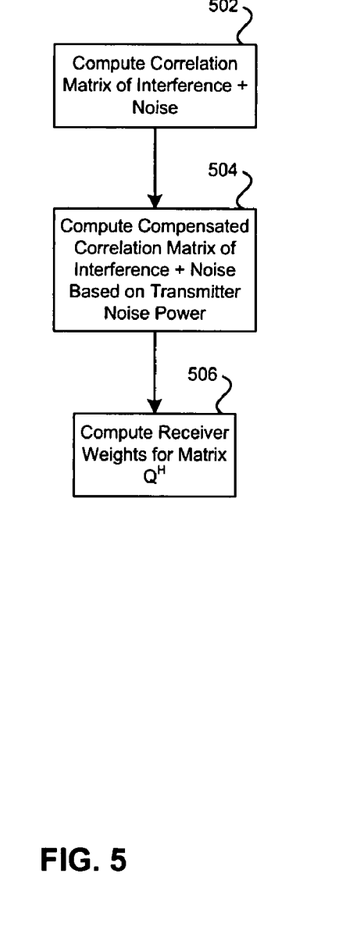
FIG. 5 is a flowchart illustrating exemplary steps for nulling at a MIMO receiver without GMD optimization, in accordance with an embodiment of the invention.

FIG. 5 is a flowchart illustrating exemplary steps for nulling at a MIMO receiver without GMD optimization, in accordance with an embodiment of the invention. Referring to FIG. 5, in step 502, a correlation matrix of interference plus noise may be computed by the MIMO receiver 322. In step 504, a compensated version of the correlation matrix of interference plus noise may be computed by the MIMO receiver 322. The compensated version of the correlation matrix may compensate for transmitter-induced noise in signals receiver from the MIMO transmitter 302. In step 506, weights utilized at a MIMO receiver 322 for receiving a plurality of signals from a MIMO transmitter 302 may be computed by the MIMO receiver 322.

Figure 6:
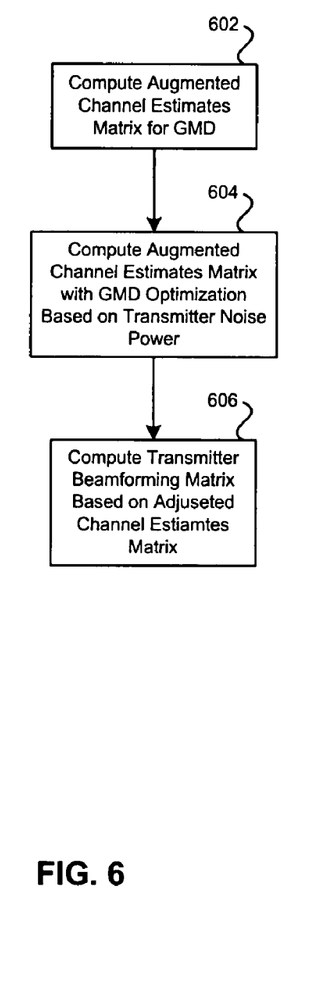
FIG. 6 is a flowchart illustrating exemplary steps for nulling at a MIMO transmitter with GMD optimization, in accordance with an embodiment of the invention.

FIG. 6 is a flowchart illustrating exemplary steps for nulling at a MIMO transmitter with GMD optimization, in accordance with an embodiment of the invention. Referring to FIG. 6, in step 602, an augmented channel estimate matrix may be computed for the GMD method by the MIMO transmitter 302. The augmented channel estimate matrix may not compensate for transmitter-induced noise. In step 604, an augmented channel estimate matrix with GMD optimization may be computed by the MIMO transmitter 302. The matrix computed in step 604 may comprise compensation for transmitter-induced noise. In step 606, a MIMO transmitter 302 may compute beamforming weights based on the transmitter-induced noise compensation, for generating a concurrently transmitted plurality of signals. The compensation performed at the transmitter 302 may enable the MIMO receiver 322 to compensate for transmitter-induced noise when detecting destination streams contained in the received plurality of concurrent signals in accordance with GMD constraints.

In various embodiments of the invention, aspects of a system for minimizing effects of transmitter impairments in MIMO beamforming communication systems may comprise a transmitter 302 that enables nulling of transmitter-induced noise by adjusting at least a portion of a plurality of signals transmitted based on a transmitter error vector magnitude (EVM). The transmitter 302 may enable transmission of the plurality of signals subsequent to the nulling.

The transmitter 302 may also enable computation of a modified channel estimate matrix based on a channel estimate matrix, a channel noise matrix, a channel noise value based on the channel noise matrix, and/or the transmitter EVM. The transmitter 302 may also enable computation of beamforming weights utilized for adjusting the signals based on the modified channel estimate matrix. The transmitter 302 may enable generation of the plurality of signals by combining of a plurality of spatial streams based on the beamforming weights.

In one aspect of the invention, a signal to noise ratio (SNR) for one of the plurality of spatial streams may be approximately equal to a corresponding SNR for each remaining one of the plurality of spatial streams. In addition, a modulation type of one of the plurality of spatial streams may also be utilized for each remaining one of the plurality of spatial streams. These conditions may be met in MIMO communication systems that utilize a GMD approach, for example.

In another aspect of the invention, an SNR for one of the plurality of spatial streams may differ from a corresponding SNR for one or more of a remainder of the plurality of spatial streams. In addition, a modulation type of one of the plurality of spatial streams may be a different modulation type from a corresponding modulation type utilized for the one or more of the remaining plurality of spatial streams. These conditions may be met in MIMO communications systems that utilize LST and/or SVD approaches, for example.

In various other embodiments of the invention, aspects of a system for minimizing effects of transmitter impairments in MIMO beamforming communication systems may comprise a receiver 322 that enables nulling of transmitter-induced noise contained in a plurality of received signals based on a transmitter EVM. Each of the plurality of received signals may comprise information contained in a plurality of spatial streams. The receiver 322 may enable detecting estimated values for the information contained in the plurality of spatial streams based on the nulling.

The receiver 322 may enable computation of an upper triangular matrix, a lower triangular matrix, or a diagonal matrix based on a channel estimate matrix, a channel noise matrix, and the transmitter EVM. The channel estimate matrix may comprise a plurality of channel estimates values associated with an RF channel. The RF channel may be utilized for receiving the plurality of received signals. The channel noise matrix may comprise values for channel noise associated with the RF channel. The receiver 322 may also enable computation of weights utilized for detecting the estimated values based on the upper triangular matrix, lower triangular matrix, and/or diagonal matrix.

Figure 7:
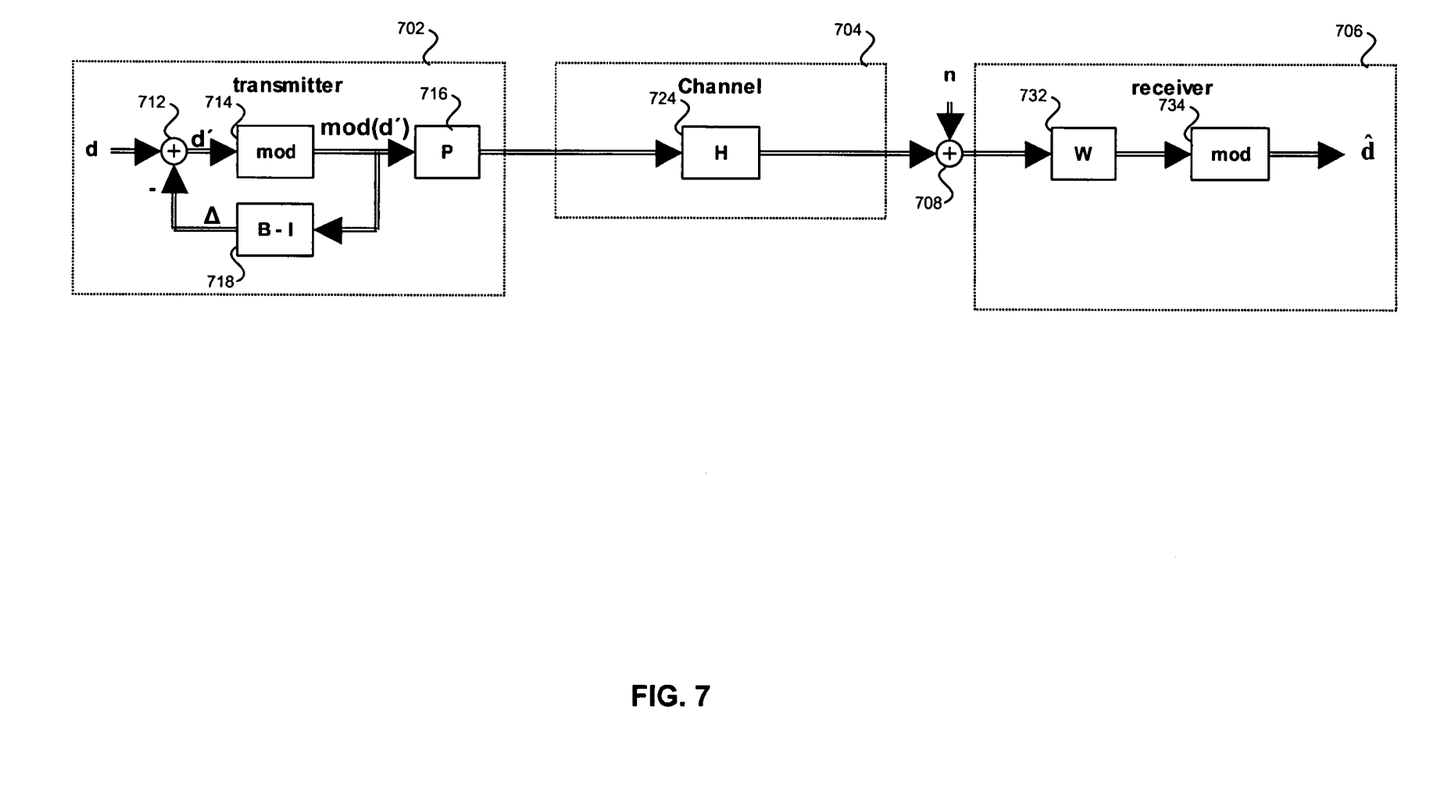
FIG. 7 is a block diagram for an exemplary system for minimizing effects of transmitter impairments based on Tomlinson-Harashima precoding (THP) using GMD, in accordance with an embodiment of the invention.

FIG. 7 is a block diagram for an exemplary system for minimizing effects of transmitter impairments based on Tomlinson-Harashima precoding (THP) using GMD, in accordance with an embodiment of the invention. Referring to FIG. 7, there is shown a transmitter 702, an RF channel 704, a receiver 706, and an adder function 708. The transmitter 702 may comprise an adder block 712, a modulus block 714, a beamforming block 716, and a feedback block 718. The RF channel 704 may be characterized by a channel estimate matrix, H, 724. The receiver 706 may comprise a beamforming block 732, and a modulus block 734.

The transmitter 702 may be substantially as described for the transmitter 302 (FIG. 3). The receiver 706 may be substantially as described for the receiver 322. The RF channel 704 may be substantially as described for the plurality of RF channels 342. The beamforming block 716 may be substantially as described for the transmit coefficient filter block P 304. The beamforming block 732 may be substantially as described for the receive filter coefficient block $Q^H$ 324.

The adder function 708 may represent the addition of noise, as represented by a noise vector n, to a plurality of signals transmitted via the RF channel 704. Consequently, the receiver 706 may receive a plurality of signals as described in connection with FIG. 3, $y_1, y_2, \ldots, y_M$, whose values may be computed based on the plurality of transmitted signals $x_1, x_2, \ldots, x_N$, the channel estimate matrix H, and the noise vector n.

The adder block 712 may comprise suitable logic, circuitry, and/or code that may enable binary addition and/or binary subtraction of corresponding digital representations of input signals to produce an output signal. The output signal may comprise a digital representation of the addition and/or subtraction of the corresponding input signals.

The modulus block 714 may comprise suitable logic, circuitry, and/or code that may be utilized to generate an output signal value that is about equal to a modulus value of an input signal. The modulus value may be computed for a numerical base value associated with the modulus function performed by the modulus block 714. For example, if the numerical base value is 4, then the output signal value may be about equal to the modulus 4 value for the input signal. The modulus block 734 may be substantially as described for the modulus block 734.

The feedback block 718 may comprise suitable logic, circuitry, and/or code that may be utilized to enable generation of an output vector representation of a plurality of output signals based on an input vector representation of a plurality of input signals, and a generated matrix. The generated matrix may be represented as an upper triangular or lower triangular matrix. The output vector may comprise a feedback vector.

In operation, the transmitter 702 may transmit a plurality of signals $x_1, x_2, \ldots, x_N$, as in FIG. 3. The transmitted signal may comprise transmitter induced noise, for example due to cross talk noise introduced by circuitry within the transmitter 702 that results in coupling of the transmitted plurality of signals. The receiver 706 may receive a corresponding plurality of signals $y_1, y_2, \ldots, y_M$, via the RF channel 704 wherein the received plurality of signals comprises the transmitter induced noise that was introduced at the transmitter 702. In various embodiments of the invention, a THP method utilizing GMD may be employed to null transmitter induced noise at the transmitter 702 by adjusting signal values for at least a portion of the plurality of transmitted signals $x_1, x_2, \ldots, x_N$.

The transmitter 702 may receive an input vector d. The input vector d may represent a plurality of spatial streams, $s_1, s_2, \ldots, s_K$, as in FIG. 3. The adder block 712 may receive the input vector d, and a feedback vector Δ, to generate an output vector d'. The modified vector d' may comprise values at least a portion of which may represent adjusted signal values for corresponding values in the input vector d.

The feedback vector Δ may be computed by the feedback block 718. The value for the feedback vector may be computed based on the following equation, for example:

$$\Delta = (B-I) \cdot \mathrm{mod}_{base}(d') \qquad \text{equation[13]}$$

where $\mathrm{mod}_{base}(x)$ may represent a modulus value for x given a numerical base value according to the variable base, B may represent a matrix computed by the feedback block 718, and I may represent an identity matrix.

The modulus function $\mathrm{mod}_{base}(d')$, computed by the modulus block 714, may enable the computed values to stay within a determined range of values as determined by the variable base.

The feedback vector Δ, computed by the feedback block 718 may enable the transmitter 702 to null transmitter induced noise, in accordance with various embodiments of the invention. The matrix B may be computed based on the augmented channel estimate matrix, $\tilde{H}_a$, as in equation[11], from which a matrix W is computed based on an MMSE analysis as in the following equation:

$$W = R_{I+N}^{-1} \cdot \tilde{H}_a^* \quad \text{equation[14]}$$

where M* is a complex conjugate of the matrix M, and $R^*_{I+N}$ is a conjugate correlation matrix of interference plus noise. Based on equation[14], the matrix B may be computed as in the following equation, for example:

$$B = W \cdot \tilde{H}_a \cdot P \bullet I_U \quad \text{equation[15]}$$

where • may represent a Hadamard product operation, P may represent the beamforming P matrix, and $I_U$ may represent an upper triangular matrix wherein each of the nonzero matrix elements comprises a value of 1.

The matrix B may be an upper triangular matrix in which each of the diagonal matrix elements comprise a value of 1. Consequently, for the matrix (B−I), each of the diagonal matrix elements may comprise a value of 0.

By utilizing an augmented channel estimate matrix $\tilde{H}_a$, the feedback vector Δmay comprise values based on EVM noise power at the transmitter 702. Consequently, the feedback vector may be utilized to null transmitter induced noise in signals transmitted by the transmitter 702 based on a THP method utilizing GMD.

The beamforming block 716 may generate transmitted signals based on the vector of modulus values $\text{mod}_{base}(d')$ computed by the modulus block 714. The receiver 706 may perform beamforming on the received plurality of signals based on the beamforming block 732, and utilize the modulus block 734 to compute corresponding modulus values.

Various embodiments of the invention may not be limited to GMD and/or LST methods. The invention may also be practiced in systems that utilize other methods, for example singular value decomposition (SVD).

Accordingly, the present invention may be realized in hardware, software, or a combination of hardware and software. The present invention may be realized in a centralized fashion in at least one computer system, or in a distributed fashion where different elements are spread across several interconnected computer systems. Any kind of computer system or other apparatus adapted for carrying out the methods described herein is suited. A typical combination of hardware and software may be a general-purpose computer system with a computer program that, when being loaded and executed, controls the computer system such that it carries out the methods described herein.

The present invention may also be embedded in a computer program product, which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

While the present invention has been described with reference to certain embodiments, it will be understood by those skilled in the art that various changes may be made and equivalents may be substituted without departing from the scope of the present invention. In addition, many modifications may be made to adapt a particular situation or material to the teachings of the present invention without departing from its scope. Therefore, it is intended that the present invention not be limited to the particular embodiment disclosed, but that the present invention will include all embodiments falling within the scope of the appended claims.

What is claimed is:

1. A system for processing signals in a communication system, the system comprising:
   circuitry, in a MIMO communication system, that enables nulling of transmitter-induced noise by adjusting at least a portion of a plurality of signals transmitted based on a transmitter error vector magnitude;
   wherein said circuitry enables:
      transmission of said plurality of signals subsequent to said nulling;
      computation of a modified channel estimate matrix based on one or more of the following: a channel estimate matrix, a channel noise matrix, a channel noise value based on said channel noise matrix, and said transmitter error vector magnitude; and
      computation of beamforming weights utilized for said adjusting said at least a portion of said plurality of signals based on said modified channel estimate matrix.

2. The system according to claim 1, wherein said circuitry enables combination of a plurality of spatial streams based on said beamforming weights to generate said plurality of signals.

3. The system according to claim 2, wherein a signal to noise ratio for one or more of said plurality of spatial streams is approximately equal to a corresponding signal to noise ratio for each remaining one or more of said plurality of spatial streams.

4. The system according to claim 3, wherein a modulation type of said one or more of said plurality of spatial streams is also utilized for said each remaining one or more of said plurality of spatial streams.

5. The system according to claim 2, wherein a signal to noise ratio for one or more of said plurality of spatial streams differs from a corresponding signal to noise ratio for one or more of a remainder of said plurality of spatial streams.

6. The system according to claim 5, wherein a modulation type of said one or more of said plurality of spatial streams is a different modulation type from a corresponding modulation type utilized for said one or more of said remainder of said plurality of spatial streams.

* * * * *